United States Patent [19]

Watari

[11] Patent Number: 4,882,756
[45] Date of Patent: Nov. 21, 1989

[54] PATTERN MATCHING SYSTEM USING DYNAMIC PROGRAMMING

[75] Inventor: Masao Watari, Tokyo, Japan

[73] Assignee: NEC Corporation, Tokyo, Japan

[21] Appl. No.: 308,985

[22] Filed: Feb. 10, 1989

Related U.S. Application Data

[63] Continuation of Ser. No. 664,732, Oct. 25, 1984, abandoned.

[30] Foreign Application Priority Data

Oct. 27, 1983 [JP]  Japan .................................. 58-201385

[51] Int. Cl.$^4$ ........................... G10L 5/06; G10L 9/00
[52] U.S. Cl. ......................................... 381/42; 381/43
[58] Field of Search .................. 364/513.5; 381/41–43

[56] References Cited

U.S. PATENT DOCUMENTS

| | | | |
|---|---|---|---|
| 3,816,722 | 6/1974 | Sakoe et al. ........................... | 381/43 |
| 4,059,725 | 11/1977 | Sakoe ..................................... | 381/43 |
| 4,400,788 | 8/1983 | Myers et al. ........................... | 381/43 |
| 4,489,434 | 12/1984 | Moshier ................................. | 381/43 |
| 4,489,435 | 12/1984 | Moshier ................................. | 381/43 |
| 4,530,110 | 7/1985 | Nojiri et al. ........................... | 381/43 |
| 4,570,232 | 2/1986 | Shikano ................................. | 381/43 |
| 4,601,054 | 7/1986 | Watari et al. ........................... | 381/42 |
| 4,667,341 | 5/1987 | Watari ................................... | 364/513.5 |

Primary Examiner—Gary V. Harkcom
Assistant Examiner—David D. Knepper
Attorney, Agent, or Firm—Sughrue, Mion, Zinn, Macpeak & Seas

[57] ABSTRACT

A pattern matching system and method in which feature vectors of an input pattern to be identified are compared with a plurality of stored reference patterns in order to identify the input pattern. A number L of feature vectors from the input pattern and a feature vector from one of the reference patterns are read into a distance computation unit, under control of a pattern matching control unit. Inter-vector distances are calculated and passed to an asymptotic equation computation unit, which calculates an overall dissimilarity vector for each reference pattern. Because L feature vectors from the input pattern are read into the distance computation unit at a time, memory and reference pattern feature vector transfer requirements are decreased.

13 Claims, 6 Drawing Sheets

PATTERN MATCHING SYSTEM USING DYNAMIC PROGRAMMING

This is a continuation of application Ser. No. 664,732, filed 10/25/84 now abandoned.

BACKGROUND OF THE INVENTION

The present invention relates to an improvement in a pattern matching system for comparing two patterns expressed as a sequence of feature vectors to compute a measure (which will be called a "dissimilarity") for discrimination between the two patterns.

As speech recognizing means, a variety of methods have been tried. Of these, there has been proposed a relatively simple and effective method of pattern matching by normalizing a nonlinear extension, as is disclosed in U.S. Pat. No. 3,816,722. A speech pattern has non-linear and complex fluctuations due to fluctuations in speaking speed. This makes it necessary to consider the time-axis fluctuation when input and reference patterns are to be matched. This method warps the time axis of one of the patterns to determine the corresponding relationship (which will be called a "time-normalized function") of the time axis for approximating it to the other pattern thereby to determine a discrimination having a normalized time-axis fluctuation. The principle based on that method will be schematically described in the following (which will be called a "horizontal algorithm").

An input pattern A and an n-th reference pattern $B^n$ are expressed as a sequence of feature vectors (one of which will be called "one frame") by the following Equations:

$$A = \vec{a_1}, \vec{a_2}, \ldots, \vec{a_i}, \ldots, \vec{a_I} \quad (1);$$

and $$B^n = \vec{b_1}, \vec{b_2}, \ldots, \vec{b_j^n}, \ldots, \vec{b_J^n} \quad (2)$$

When a function (i.e., the time-normalized function) for realizing a mapping from the time axis i of the input pattern onto the corresponding j of the reference pattern is expressed by $j = j(i)$, the normalized difference $D(A, B^n)$ in which the time-axis fluctuation is normalized is attained as a solution of the following minimization problem:

$$D(A, B_n) = \min_{j = j(i)} \left( \sum_{i=1}^{I} d(i, j) \right) \quad (3)$$

where $$d(i,j) = ||\vec{a_i} - \vec{b_j^n}|| \quad (4)$$

This minimization problem is to derive $g_n(I, J)$ by computing (for one horizontal line) the following asymptotic equation from $i = j - r$ to $i = j + r$ for fixed j:

$$g_n(i, j) = d(i, j) + \min \begin{cases} g_n(i - 1, j) \\ g_n(i - 1, j - 1) \\ g_n(i - 1, j - 2) \end{cases} \quad (6)$$

under the following initial condition:

$$g_n = (0, 0) = 0 \quad (5)$$

and by advancing the computation of one horizontal line from $j = 1$ to $j = J$ along the j-axis. The value $g_n(I, J)$ thus derived is the normalized dissimilarity $D(A, B^n)$.

The computation of the j-th line of the horizontal algorithm requires the $(i-r)$th to $(i+r)$th frames of the input pattern and the j-th frame of the reference pattern. The computation of the $(j+1)$th line requires the $(i-r+1)$th to $(i+r+1)$th frames of the input pattern and the $(j+1)$th frame of the reference pattern. If the $(i-r)$th frame of the input pattern is neglected for the frame which was used for computation of the j-th line and if the $(i+r+1)$th frame of the input pattern and the $(j+1)$th frame of the reference pattern are added, however, it is possible to execute the computation of the $(j+1)$th line. In other words, the pattern matching system for executing the horizontal algorithm is equipped with pattern buffers for the $(2r+1)$ frames of the input pattern and for one frame of the reference pattern and reads in one frame of the input pattern and one frame of the reference pattern for the one horizontal line computation thereby to compute the distance of Equation (4) and the asymptotic Equation (6).

If one horizontal line computation is repeated for each reference pattern when the normalized dissimilarity from N reference patterns is to be determined, the value $g_n(i, j)$ derived for the j-th line is used for each reference pattern, when the $(j+1)$th line is to be computed, thereby necessitating the temporary storage of the values $g_n(i, j)$ of N reference patterns. Keeping out the temporary storage, the computations of one horizontal line are conducted from 1 to J for each reference pattern. In this case, the dissimilarities $g_n(i, j)$ can be consecutively stored in the memories for three lines, i.e., j-th, $(j-1)$th and $(j-2)$th lines so that the number of the memories for the dissimilarities $g_n(i, j)$ can be reduced. Since the operations of deriving the normalized dissimilarities from one reference pattern are repeated N times, however, the computations are started after the final frame of the input pattern is attained.

As has been described above, there is not much transfer of pattern data in the pattern matching system for executing the horizontal algorithm. However, the pattern matching system has shortcomings in that it requires buffer memories having a large capacity for the $(2r+2)$ frames of the feature vectors, and in that its response is delayed because the computations cannot be started before the final frame of the input pattern is attained.

On the other hand, there has been proposed by the present inventor and others, as is disclosed in U.S. patent application Ser. No. 447,829, a method (which will be called a "vertical algorithm") in which the order of computing the asymptotic Equation (6) is interchanged between i and j.

According to this method, the value $g_n(I, J)$, i.e., the normalized dissimilarity $D(A, B^n)$ is derived by computing (for one column) the asymptotic Equation (6) from $j = i - r$ to $J = i + r$ for fixed i and by advancing the computations of the one column from $i = 1$ to $i = I$ along the i-axis. The computation of one column of the vertical algorithm can be advanced in synchronism with the input of each frame of the input pattern, because it is conducted along the time axis i of the input pattern, so that its response time can be shortened.

When the dissimilarities from the N reference patterns are to be computed in synchronism with the input of the input pattern, however, the one column computation is repeated for the N reference patterns, and the resultant dissimilarity $g_n(i, j)$ is temporarily stored for each reference pattern so that it is used for the next column computation. This makes it necessary to provide memories of one column of the dissimilarity $g_n(i, j)$, respectively, for the N reference patterns. For one column computation, on the other hand, the refernce pattern buffers need be provided for only one frame because the reference patterns are consecutively interchanged.

As has been described hereinbefore, the pattern matching system for executing the vertical algorithm can advance the computations in synchronism with the input of each frame of the input pattern so that the computed result can be obtained immediately after the input of the final frame of the input pattern. Moreover, the pattern buffer memories required for the distance computation may have a small capacity for one frame of the input pattern and one frame of the reference pattern. Since N reference patterns must be transferred for each frame of the input pattern, however, there arises a defect that the required transfer time of the reference patterns is I times as high as that of the horizontal algorithm. In order to cure this defect, therefore, it is necessary to drop the access time of the memories to 1/I; otherwise the circuitry is complex and expensive.

SUMMARY OF THE INVENTION

It is, therefore, an object of the present invention to provide a pattern matching system which can have a reduced transfer of pattern data and a reduced buffer memory capacity for pattern storage.

Another object of the present invention is to provide a pattern matching system which can have a high-speed response compatible with the above features.

Still another object of the present invention is to provide a pattern matching system which is inexpensive while enjoying the above features.

According to the present invention, there is provided a pattern matching system comprising: a pattern matching control unit for gathering L time points i of the input pattern into a block to change the block number ii from 1 to I/L thereby to change signal j indicating the time point of the reference pattern for each block number ii from the lower limit L(ii) to the upper limit U(ii) of a matching region and to change a signal l indicating the time point in one block of the input pattern from 1 to L; a distance computation unit including: an input pattern buffer having its address specified by the signal of said control unit; and a reference pattern buffer for temporarily storing the vector $\vec{b_j^n}$ at the j-th frame of the reference pattern so that the input pattern $\vec{a_i}$ and the reference pattern $\vec{b_j^n}$ may be read out from the input pattern buffer and the reference pattern buffer to derive the inter-vector distance $d(\vec{a_i}, \vec{b_j^n})$; and an asymptotic equation computation unit including a difference memory $G_n(j)$, which has its address specified by the signals j and n of the control unit, so that the asymptotic equation of a dynamic programming operation is computed for the time point j of each reference pattern and for each time point l in one block of the input pattern with reference to the distance $d(\vec{a_i}, \vec{b_j^n})$ under the connecting condition of the dissimilarity $G_n(j)$ at the time point (ii-1)·L for the block number ii of the time point of the input pattern, thereby to derive the dissimilarity $G_n(j)$ at the time point ii·L of the input pattern.

DESCRIPTION OF THE PREFERRED EMBODIMENT

Figure 1:
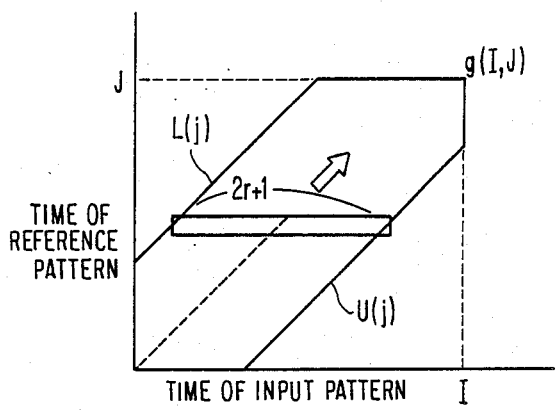
FIG. 1 is a diagram showing the sequence of computing the pattern matching on the basis of the horizontal algorithm of the prior art.
Figure 2:
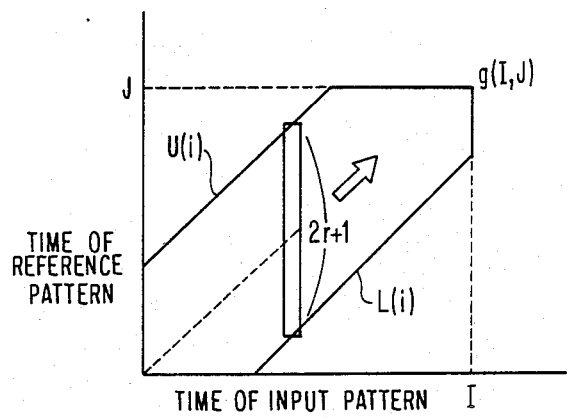
FIG. 2 is a diagram showing the sequence of computing the pattern matching on the basis of the vertical algorithm of the prior art.
Figure 3:
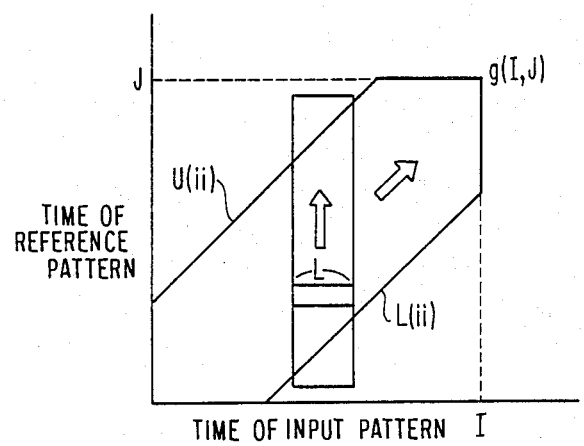
FIG. 3 is a diagram showing the sequence of computing the pattern matching on the basis of an algorithm according to the present invention.

First of all, the differences between the present invention and the conventional methods will be described with reference to FIGS. 1 to 3. FIGS. 1 and 2 show the orders of computing the pattern matchings of the horizontal and vertical algorithms. The former method requires large buffer memories and has a relatively long response time, whereas the latter method requires the transfer of N reference patterns for each frame of the input pattern, although the response time is reduced, so that a greater number of patterns can be transferred, as compared with the former horizontal algorithm.

Figure 4A:
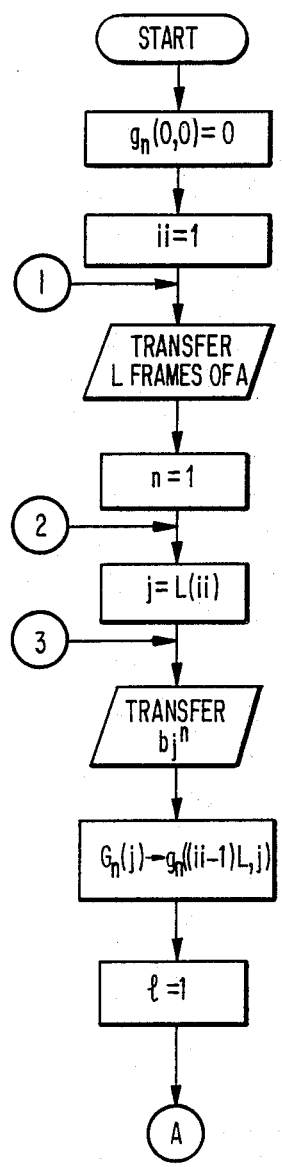
FIGS. 4A and 4B are flow charts showing the fundamental principle of the present invention.
Figure 4B:
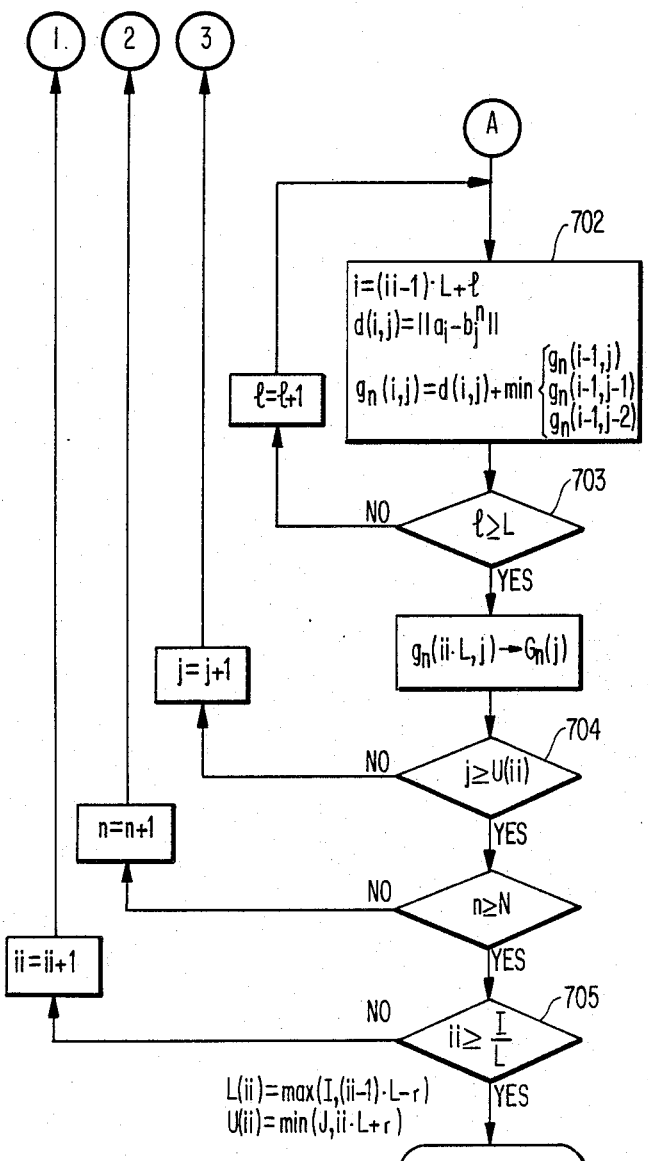

According to the method of the present invention, the sequence of computing the asymptotic Equation (6) for solving the minimization problem of Equation (3) is different from those of the horizontal and vertical algorithms of the prior art. According to the method of the present invention, more specifically, as shown in the flow charts of FIGS. 4A and 4B, L time axes i of the input pattern are gathered into a block ii, in which: the dissimilarity $G_n(j)$ at i=(ii−1)·L is read out to execute computation for fixed j from i=(ii−1)·L+1 to ii·L (i.e., the computation of one line: the computations of blocks 702 and 703 of FIG. 4B) and to store the dissimilarity for i=ii·L in the $G_n(j)$; one line computation is executed from j=(ii−1)·L+1−r (i.e., the computation of L columns: the computations of blocks 701, 702, 703 and 704 of FIGS. 4A and 4B) and the computations of those L columns are advanced from ii=1 to ii=I/L along the i-axis (i.e., the computation of block 705 of FIG. 4B), thus deriving the value $g_n(I, J)$, i.e., the normalized dissimilarity $D(A, B^n)$.

Since the computations of the L columns may be executed I/L times, according to the method of the present invention, the number of transfer of the N number of reference patterns is reduced to I/L so that the quantity of transfer is reduced to 1/L, as compared with the vertical algorithm. Since the computations of the L columns are advanced along the i-axis, moreover, the computation of the dissimilarity can be executed in synchronism with the input of the input pattern, and the computed result can be attained immediately after the input of the final frame of the input pattern so that the response time is shortened. Still further, the pattern buffers required for the computation of the one line in this invention are those for the L frames of the input pattern and one frame of the reference pattern so that they are reduced to $(L+1)/(2r+2)$, as compared with that of the horizontal algorithm.

As has been described above, the pattern matching system according to the present invention has the following advantages: a small quantity of transfer of the pattern data; a small capacity of the pattern buffer memories; and a short response time.

Figure 5:
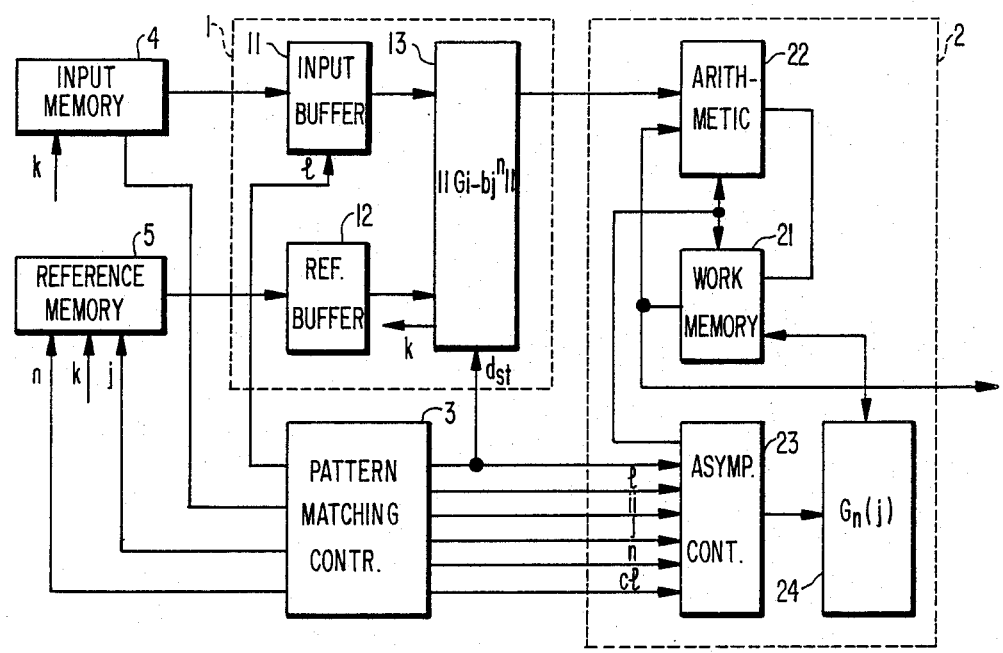
FIG. 5 is a block diagram showing the construction of a pattern matching system according to one embodiment of the present invention.

Next, the present invention will be described in the following in connection with one embodiment thereof with reference to the accompanying drawings. The pattern matching system according to the present invention is composed of, as shown in FIG. 5, a distance computation unit 1, an asymptotic equation computation unit 2, and a pattern matching control unit 3. The distance computation unit 1 is composed of: an input pattern buffer 11 for storing L frames of the input pattern; a reference pattern buffer 12 for storing one frame of the reference pattern; and an inter-vector distance computation unit 13 for deriving the inter-vector distance $||\vec{a_i}-\vec{b_j^n}||$ between the i-th frame $\vec{a_i}$ of the input pattern and the j-th frame $\vec{b_j^n}$ of the reference pattern. The asymptotic equation computation unit 2 is composed of a work memory 21, an arithmetic unit 22, an asymptotic equation arithmetic control unit 23 and a dissimilarity memory 24. The pattern matching control unit 3 controls the distance computation unit 1, the asymptotic equation computation unit 2, an input pattern memory 4 and a reference pattern memory 5 in accordance with the time chart shown in FIG. 8.

The value $\overline{G_n}(0)$ in the dissimilarity memory 24 is cleared in response to a signal C 1. Next, the $((ii-1)\cdot L+1)$th to $ii\cdot L$-th frames of the input pattern are transferred from the input pattern memory 4 to the input pattern buffer 11. Furthermore, the j-th frame of the n-th reference pattern, which is indicated by signals n and j, is transferred to the reference pattern buffer 12. Subsequently, the value $G_n(j)$ of the dissimilarity memory 24 is read out and stored in the $g_n((ii-1)\cdot L, J)$ address of the work memory 21.

Subsequently, in response to a signal $d_{st}$ generated by the pattern matching control unit 3, the inter-vector distance arithmetic unit 13 conducts the computation of $||\vec{a_i}-\vec{b_j^n}||$.

The inter-vector distance is derived from the following equation, for example:

$$d(i, j) = ||\vec{a_i} - \vec{b_j^n}|| = \sum_{k=1}^{K} |\vec{a_{ik}} - \vec{b_{jk}^n}| \qquad (7)$$

Figure 6:
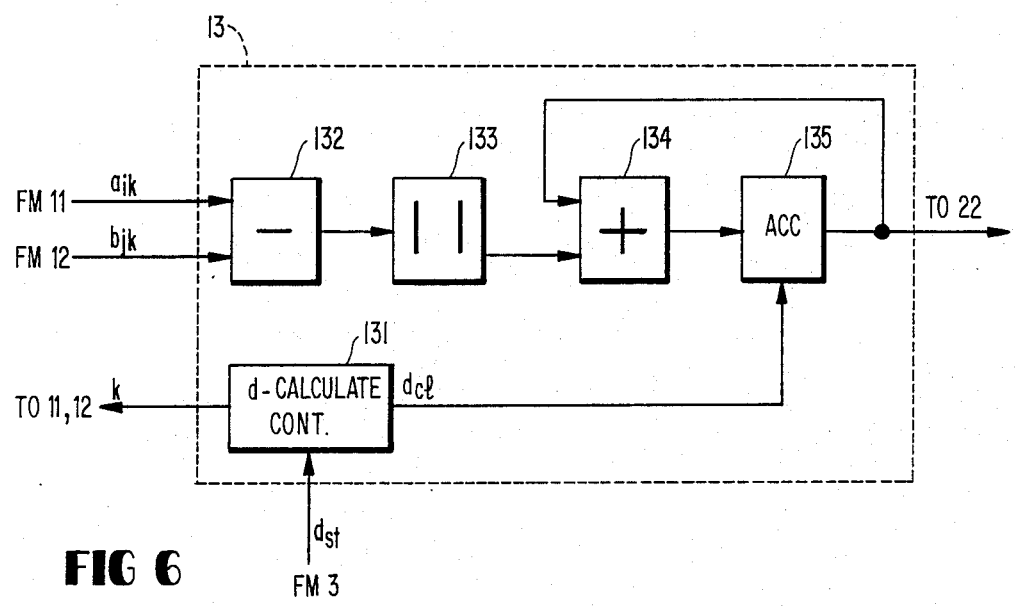
FIGS. 6 and 7 are block diagrams showing the detailed constructions of a distance computation unit and an asymptotic equation computation unit appearing in the block diagram of FIG. 5.
Figure 9:
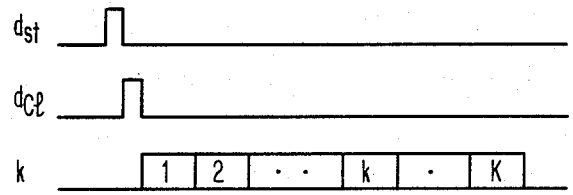

The inter-vector distance arithmetic unit 13 operates, as shown in FIGS. 6 and 9: first to clear an accumulator 135 in response to a signal $d_{cl}$ generated from an inter-vector distance arithmetic control unit 131; to read out the values $\vec{a_{ik}}$ and $\vec{b_{jk}^n}$ from the input pattern buffer 11 and the reference pattern buffer 12 in response to a signal k varying from 1 to K, which is generated by the inter-vector distance arithmetic control unit 131; to derive the value $|\vec{a_{ik}}-\vec{b_{jk}^n}|$ by a subtractor 132 and an absolute value circuit 133; and to derive the summation of $|\vec{a_{ik}}-\vec{b_{jk}^n}|$ by an adder 134 and the accumulator 135.

Here, the l-th frame of the input buffer 11 is stored with the $((ii-1) L+1)$th frame of the input pattern.

Figure 7:
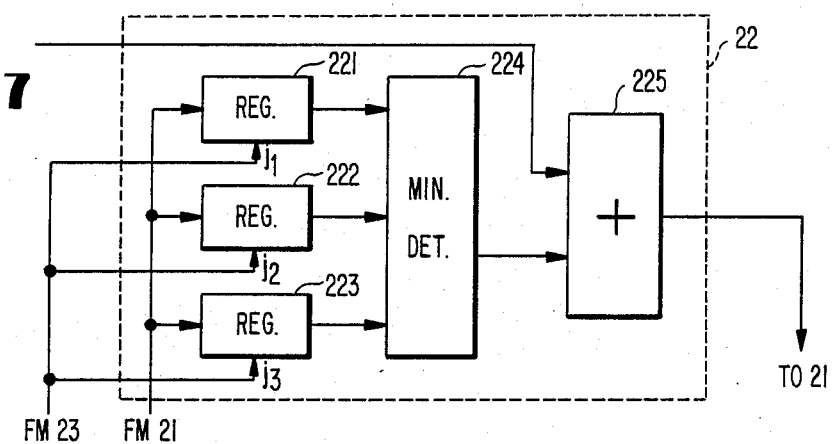
Figure 10:
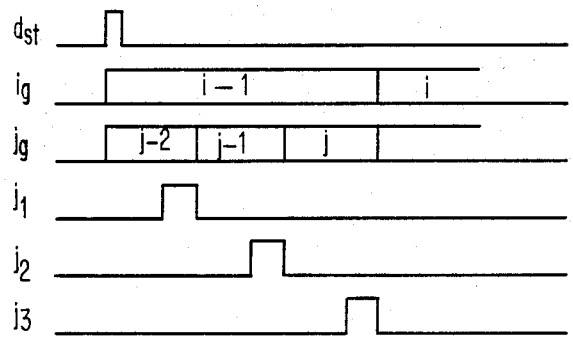

Subsequently, the arithmetic unit 22 shown in FIG. 7 computes the asymptotic Equation (6) by the use of both the distance d(i, j) attained by the inter-vector distance arithmetic unit 13 and the value $g_n(i, j)$ of the work memory 21. The asymptotic equation arithmetic control unit 23 outputs signals $j_1$, $j_2$ and $j_3$, as shown in the time chart of FIG. 10, in response to the signal i $(i=(ii-1)\cdot L+1)$, which is generated by the pattern matching control unit 3, and reads out and sets the values $g_n(i-1, j-2)$, $g_n(i-1, j-1)$ and $g_n(i-1, j)$ in registers 221, 222 and 223, respectively. A comparator 224 compares the registers 221, 222 and 223 to output a minimum. An adder 225 adds the distance d(i, j) and the output of the comparator 224 so that the resultant summation is written as $g_n(i, j)$.

Figure 8:
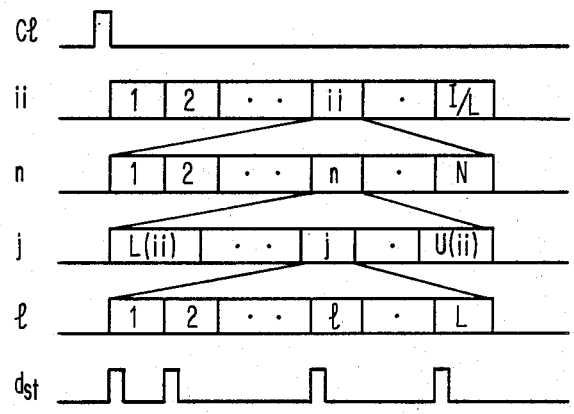
FIGS. 8, 9 and 10 are time charts showing the operations of the pattern matching system of the present invention shown in FIG. 5.

The pattern matching control unit 3 controls the distance computation unit 1 and the asymptotic equation computation unit 2 in accordance with the time chart shown in FIG. 8 to derive the computations of the asymptotic Equation (6) for the l from 1 to L thereby to conduct the computation of the one line. Subsequently, the pattern matching control unit 3 reads out the value $g_n(ii\cdot L, j)$ from the work memory 21 and stores it in the $G_n(j)$ of the dissimilarity memory 24. Subsequently, the control unit 3 derives the value j from its lower limit L(ii) to its upper limit U(ii) to conduct computations of the L columns. Subsequently, the control unit 3 derives the value n from 1 to N to conduct computations the L of columns of the N reference patterns. The control unit 3 derives the value ii from 1 to I/L to attain the value $g_n(I, J)$. Here, the lower limit L(ii) and the upper limit U(ii) indicate the limits of the range for computing the asymptotic equation, as shown in FIG. 3, and are given by the following equations:

$$L(ii) = \max(1, (ii-1)\cdot L - r) \qquad (8);$$

and $$U(ii) = \min(J, ii\cdot L + r) \qquad (9)$$

The present invention has been described hereinbefore in connection with the embodiment thereof but should not have its scope limited to the foregoing description. Especially in the description of the present invention, the work memory 21 can be replaced by a ring buffer comprising 3L memories. Specifically, if the computation of the j-th line uses $g_n(i, j) \to X$, $g_n(i, j-1) \to Y$, and $g_n(i, j-2) \to Z$, the computation of the $(j+1)$th line can be conducted by using $g_n(i, j+1) \to Z$, $g_n(i, j) \to X$, and $g_n(i, j-1) \to Y$.

On the other hand, the simple Equation (6) was used as the asymptotic equation but may be replaced by another arbitrary asymptotic equation. For example, it is conceivable to use a method using the following Equations:

$$g_n(i, j) = d(i, j) + \min \begin{cases} d(i-1, j) + g_n(i-2, j-1) \\ g_n(i-1, j-1) \\ g_n(i-1, j-2) \end{cases} \qquad (10)$$

In this case, however, $2\cdot(2r+1)$ N memories for the two columns are required as the dissimilarity memories because of necessity of the dissimilarity data until the (i−2)th column.

Moreover, the distance between the input pattern $\vec{a_i}$ and reference pattern $b_j^n$ was described by using the distance measure of Equation (4) but may apparently be replaced by a Euclidean distance, as is expressed by the following Equation (11), or by an inner product, as is expressed by the following Equation (12):

$$d(i, j) = \sum_{k=1}^{K} (a_{ik} - b_{jk}^n)^2; \quad (11)$$

and $$d(i, j) = -\sum_{k=1}^{K} (a_{ik} \times b_{jk}^n). \quad (12)$$

What is claimed is:

1. A pattern matching system for deriving the minimum of the dissimilarity defined by the sum of the inter-vector distances d ($a_i$, $b_j^n$) of an input pattern A=$a_1$, $a_2$, ---, $a_I$ expressed by a sequence of feature vectors and an n-th reference pattern $B^n$=$b_1^n$, $b_2^n$, ---, and $b_j^n$ of a number N of reference patterns stored beforehand on a time function j(i) for establishing correspondence between a time axis i of the input pattern A and a time axis j of the reference pattern $B^n$, said system comprising:
   a pattern matching control unit for gathering a number L of time points i of said input pattern into a block of feature vectors, 1<L<I, incrementing a block number ii from 1 to I/L, incrementing a signal $S_j$, indicating the time point of said reference pattern for each block number ii, from a lower limit L(ii) to an upper limit U(ii) of a matching region, and incrementing a signal, indicating the time point in one block of said input pattern, from 1 to L;
   a distance computation unit including: an input pattern buffer having its address specified by the signal of said control unit; and a reference pattern buffer for temporarily storing the vector $b_j^n$ at the j-th frame of said reference pattern so that said input pattern $a_i$ and said reference pattern $b_j^n$ may be read out from said input pattern buffer and said reference pattern buffer to derive said inter-vector distance d($a_i$, $b_j^n$); and
   an asymptotic equation computation unit including a dissimilarity memory $G_n(j)$, which has its address specified by said signal j and a signal n of said control unit, so that the asymptotic equation of a dynamic programming is computed for the time point j of each reference pattern and for each time point in one block of said input pattern with reference to said distance d($a_i$, $b_j^n$) under the connecting condition of the dissimilarity $G_n(j)$ at a time point (ii−1)·L for the block number ii of the time point i of said input pattern, thereby to derive the dissimilarity $G_n(j)$ at the time point ii·L of said input pattern.

2. A pattern matching system according to claim 1, wherein said dynamic programming asymptotic equation is expressed by the following equations:

$$g_n(i, j) = d(i, j) + \min \begin{cases} g_n(i - 1, j) \\ g_n(i - 1, j - 1) \\ g_n(i - 1, j - 2). \end{cases}$$

3. A pattern matching system according to claim 1, wherein said dynamic programming asymptotic equation is expressed by the following equations:

$$g_n(i, j) = d(i, j) + \min \begin{cases} d(i - 1, j) + g_n(i - 2, j - 1) \\ g_n(i - 1, j - 1) \\ g_n(i - 1, j - 2). \end{cases}$$

4. A pattern matching system according to claim 1, wherein said distance computation unit derives the distance d(i, j) expressed by the following equation:

$$d(i, j) = ||a_i - b_j||.$$

5. A pattern matching system according to claim 1, wherein said distance computation unit executes a computation on the basis of a Euclidean distance expressed by the following equation:

$$d(i, j) = \sum_{k=1}^{K} (a_{ik} - b_{jk}^n)^2.$$

6. A pattern matching system according to claim 1, wherein said distance computation unit executes a computation on the basis of an inner product expressed by the following equation:

$$d(i, j) = -\sum_{k=1}^{K} (a_{ik} \times b_{jk}^n).$$

7. A method of pattern matching in which an input pattern A comprising a time sequence of feature vectors $a_1$, $a_2$, ..., $a_I$ is compared with a number B of reference patterns $B^n$, $1 \leq n \leq N$, each of said reference patterns comprising a time sequence of feature vectors $b_1$, $b_2$, ..., $b_J$ along a second time axis j, feature vectors in each of said reference patterns being mapped onto the feature vectors of said input pattern according to a mapping j=j(i), said method comprising the steps of comparing sums of inter-vector distances d($a_i$,$b_j^n$) between said input pattern and each of said reference patterns according to a recursion algorithm, determining the smallest of said sums, and selecting one of said reference patterns in accordance with said determining step, said method further comprising the steps of:
   (1) inputting a number L of feature vectors of said input pattern into an input buffer, 1<L<I;
   (2) inputting a feature vector from an nth one of said reference patterns in accordance with a lower limit calculated as a first function of L and a positive number r;
   (3) computing an inter-vector distance between each of said L feature vectors and said reference pattern feature vector $b_j$;
   (4) computing a dissimilarity vector in accordance with said inter-vector distance and said recursion algorithm;
   (5) repeating steps (2)-(4) until an upper limit is reached, said upper limit being determined as a second function of L and said positive number r;
   (6) repeating steps (2)-(5) until step (2) has been performed for all of said reference patterns; and
   (7) performing steps (1)-(6) {I/L} times, where { } denotes a greatest integer function, said lower and upper limits being recomputed every time steps (1)-(6) are performed, wherein overall computation time is reduced as L is increased.

8. A method of pattern matching according to claim 7, wherein said recursion algorithm is $$g_n(i,j) = d(i,j) + \min \begin{cases} g_n(i-1,j) \\ g_n(i-1,j-1) \\ g_n(i-1,j-2), \end{cases}$$

wherein $g_n(i, j)$ is a dissimilarity vector and $d(i,j)$ is an inter-vector distance.

9. A method of pattern matching according to claim 7 wherein said recursion algorithm is $$g_n(i,j) = d(i,j) + \min \begin{cases} d(i-1,j) + g_n(i-2,j-1) \\ g_n(i-1,j-1) \\ g_n(i-1,j-2), \end{cases}$$

wherein $g_n(i,j)$ is a dissimilarity vector and $d(i,j)$ is an inter-vector distance.

10. A method of patter matching according to claim 7, wherein said inter-vector distance $d(i,j)$ is $||a_i - b_j||$.

11. A method of pattern maching according to claim 7, wheein said intervector distance $d(i,j)$ is $$\sum_{k=1}^{K} (a_{ik} - b_{jk}^n)^2.$$

12. A method of pattern matching according to claim 7, wherein said inter-vector distance $d(i,j)$ is $$\sum_{k=1}^{K} (a_{ik} \times b_{jk}^n).$$

13. A pattern matching system according to claim 1, wherein $L(ii) = \max(1, (ii-1) \cdot L - r)$ and $U(ii) = \min(J, ii \cdot L + r)$, wherein r is a positive number for determining a size of said matching region.

* * * * *

UNITED STATES PATENT AND TRADEMARK OFFICE
CERTIFICATE OF CORRECTION

PATENT NO. : 4,882,756

DATED : November 21, 1989

INVENTOR(S) : Masao Watari

It is certified that error appears in the above-identified patent and that said Letters Patent is hereby corrected as shown below:

Column 5, line 66, delete "$\overline{b_{jk}}^n$" and insert --$\vec{b}_{jk}^n$--

Column 7, line 23, delete "$b_j^n$" and insert --$b_J^n$--

Column 8, line 15, delete "$a_i$-$b_j$" and insert --$\vec{a}_i - \vec{b}_j$--

Column 10, line 10, delete "patter" and insert --pattern--

Column 10, line 13, delete "wheein" and insert --wherein--

Signed and Sealed this

Twenty-second Day of January, 1991

*Attest:*

HARRY F. MANBECK, JR.

*Attesting Officer*  *Commissioner of Patents and Trademarks*